(No Model.)
G. LEDER.
APPARATUS FOR EXTRACTING OIL FROM COTTON SEED.
No. 318,191. Patented May 19, 1885.
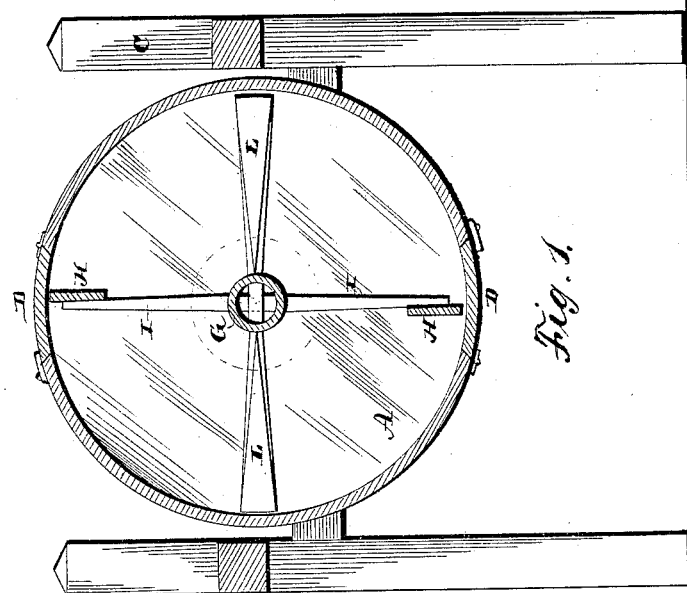
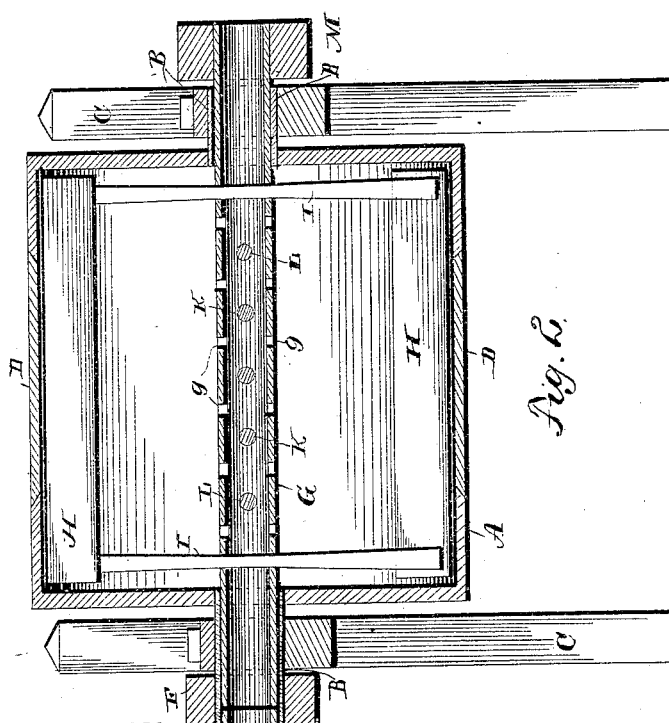
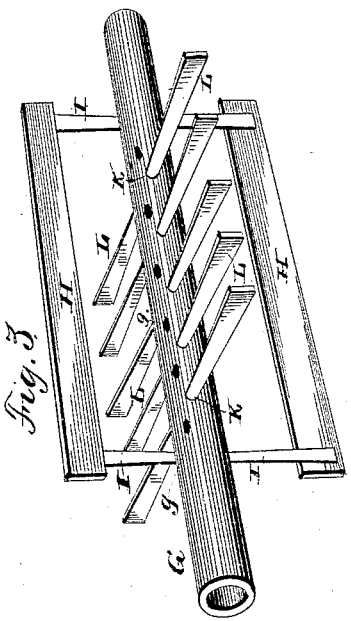
WITNESSES
INVENTOR

UNITED STATES PATENT OFFICE.

GEORGE LEDER, OF DEMOPOLIS, ALABAMA.

APPARATUS FOR EXTRACTING OIL FROM COTTON-SEED.

SPECIFICATION forming part of Letters Patent No. 318,191, dated May 19, 1885.

Application filed July 19, 1884. (No model.)

*To all whom it may concern:*

Be it known that I, GEORGE LEDER, of Demopolis, in the county of Marengo and State of Alabama, have invented certain new and useful Improvements in Apparatus for Extracting Oil from Cotton-Seed; and I do hereby declare the following to be a full, clear, and exact description of the invention, such as will enable others skilled in the art to which it appertains to make and use the same.

My invention relates to an improvement in extracting oil from cotton-seed, the object being to provide a revolving drum, which is adapted to hold the seed to be crushed, with a stirrer, mixer, and scraper adapted to scrape the walls of the drum and prevent the contents thereof from caking and forming lumps; and with these ends in view my invention consists in a hollow shaft having two scraper-arms running longitudinally therewith, the said shaft being provided with perforations adapted to receive blade-arms, which are provided for the purpose of separating the lumps.

My invention further consists in certain features of construction and combinations of parts, as will be more fully described, and pointed out in the claims.

In the accompanying drawings, Figure 1 is a view in section of the moistener. Fig. 2 is a longitudinal sectional view. Fig. 3 is a detached view of the shaft.

A represents a drum, made of suitable material and of any desired dimensions. This drum is provided with tubular bearings B, by means of which it is journaled in the supporting-frame C. The drum is further provided with the doors D, situated diametrically opposite or in any other convenient positions for putting in or taking out the meal. One of the bearings B is provided with the band-pulleys F, mounted fixedly thereon, which are connected with driving-pulleys on a countershaft. (Not shown.)

G represents a hollow shaft situated in the drum and journaled in the tubular bearings B. The shaft is provided with the scrapers H, supported on the arms I, projecting diametrically from opposite sides of the shaft. The shaft G is further provided with the perforations K, of any desired number, located in opposite sides of the periphery of the shaft, and adapted to receive the stems of the blades L therein. The said blades are set with their edges at right angles to the axis of the shaft, so that the lumps may be cut and broken by the edges thereof. The blades are secured in the perforations K in such manner as not to entirely fill the same, but to leave side spaces or openings, by means of which the steam may escape into the drum; or the shaft may be provided with the perforations $g$, through which exits the steam into the drum. One end of the shaft G extends beyond one of the bearings B, and is provided with a band-pulley, M, secured thereon, which connects with a driving-pulley on a counter-shaft, (not shown,) and by means of which it may be driven with the drum or independently thereof. The steam-pipe N is provided with an ordinary cut-off valve for regulating the flow of steam to the drum. The crushed seed is first placed in the drum A, and while the drum revolves, the meal or crushed seed falls from side to side, the steam is permitted to enter the drum through the pipe N and the shaft G, whereby the meal becomes exposed to the steam and is moistened thereby. From the drum A the moistened seed is taken to a heater, where it is thoroughly cooked by means of dry steam before it is subjected to pressure. The tubular bearings B are not necessarily steam-tight, nor is it advisable to make them so, as the expense of the apparatus would be thereby increased without any corresponding benefit, since the steam which escapes around this bearing will form the necessary exhaust. The scrapers are so arranged that they will move in close proximity to the sides of the drum, thus scraping the meal therefrom and throwing the same upon the blades, thus disintegrating the particles and stirring and mixing and exposing the whole mass thoroughly to the steam; and, furthermore, the motion of the stirrer and scraper being independent of the motion of the drum, the said scraper may be caused to rotate faster or slower than the drum and in the same or opposite direction therefrom, and by stopping the drum, with the door opening downward and causing the scraper to revolve therein, the meal may be effectually and quickly removed from the drum into a suitable receptacle placed beneath the drum.

Having fully described my invention, what I claim as new, and desire to secure by Letters Patent, is—

1. In an apparatus for extracting oil from cotton-seed, the combination, with a drum having tubular bearings, of a hollow shaft trunnioned in said bearings, said hollow shaft being provided with scrapers and blades, substantially as set forth.

2. In an apparatus for extracting oil from cotton-seed, the combination, with a drum having tubular bearings, of a hollow shaft journaled in said bearings, and provided with scrapers and disintegrating-blades, and means for rotating the shaft independently of the drum, substantially as set forth.

3. In an apparatus for extracting oil from cotton-seed, the combination, with a drum having tubular bearings, of a hollow rotary scraper-shaft journaled in said bearings, said shaft being provided with perforations, whereby the steam entering the end of the shaft is allowed to escape into the meal within the drum, substantially as set forth.

4. In an apparatus for extracting oil from cotton-seed, the combination, with a drum having tubular bearings, of a hollow shaft provided with two diametrically-opposite scraper-arms adapted to pass within close proximity to the sides of the drum, and further provided with blades set diametrically opposite each other, substantially as set forth.

5. In an apparatus for extracting oil from cotton-seed, the combination, with a drum having tubular bearings, of a hollow rotary shaft provided with two diametrically-opposite scraper-arms adapted to pass within close proximity to the sides of the drum, and further provided with blades set diametrically opposite each other, with the edges of the blades set at right angles to the axis of the shaft, substantially as set forth.

In testimony whereof I have signed this specification in the presence of two subscribing witnesses.

GEO. LEDER.

Witnesses:
J. L. BAILEY,
P. G. CORNISH.